United States Patent [19]

Astle

[11] Patent Number: 5,383,601
[45] Date of Patent: Jan. 24, 1995

[54] DRIP WATERING APPARATUS

[76] Inventor: Joseph C. Astle, 18022 Dog Bar Rd., Grass Valley, Calif. 95949

[21] Appl. No.: 222,846

[22] Filed: Apr. 5, 1994

[51] Int. Cl.⁶ .............................................. B05B 1/14
[52] U.S. Cl. ...................... 239/276; 239/542; 239/553.3; 239/553.5
[58] Field of Search ............ 239/63, 65, 273, 276, 239/280, 280.5, 542, 553, 553.3, 553.5; 47/48.5 R, 48.5 G, 79

[56] References Cited

U.S. PATENT DOCUMENTS

| | | | |
|---|---|---|---|
| 2,284,158 | 5/1942 | Lewis | 239/65 X |
| 2,334,253 | 11/1943 | Davis | 47/48.5 G |
| 2,375,860 | 5/1945 | Markham | 47/48.5 |
| 2,909,328 | 10/1959 | Babyak | 239/276 X |
| 3,026,827 | 3/1962 | Cunningham | 111/7.1 |
| 3,168,224 | 2/1965 | Rios | 222/181 |
| 3,272,225 | 9/1966 | Frampton | 137/408 |
| 3,754,352 | 8/1973 | Bates | 47/48.5 G |
| 3,755,966 | 9/1973 | Smith | 47/48.5 G |
| 3,856,205 | 12/1974 | Rohling | 239/63 |
| 4,060,991 | 12/1977 | Reese | 47/48.5 G X |
| 4,207,705 | 6/1980 | Errede et al. | 47/48.5 G |
| 4,753,394 | 6/1988 | Goodman | 47/48.5 G X |
| 4,919,165 | 4/1990 | Lloyd | 239/65 X |
| 5,117,582 | 6/1992 | Cissel, Jr. et al. | 47/48.5 X |
| 5,181,951 | 1/1993 | Cosse, Jr. | 47/48.5 X |
| 5,212,905 | 5/1993 | Philoctete | 47/485 |
| 5,252,302 | 10/1993 | Schmidt et al. | 422/261 |

Primary Examiner—Andres Kashnikow
Assistant Examiner—Lesley D. Morris
Attorney, Agent, or Firm—James M. Ritchey

[57] ABSTRACT

A drip irrigating apparatus for supplying a liquid to a plant, comprises a reservoir for containing the liquid. The reservoir has a side wall, an upper rim, and a bottom having a plurality of apertures. Holding and supporting the reservoir is a base. A cover is releasably fitted to the reservoir upper rim. An inlet control system is included for admitting and regulating an amount of incoming liquid into the reservoir. Further, an outlet control system is furnished for regulating an amount of outgoing liquid from the reservoir to the plant.

12 Claims, 6 Drawing Sheets

FIG. — 2

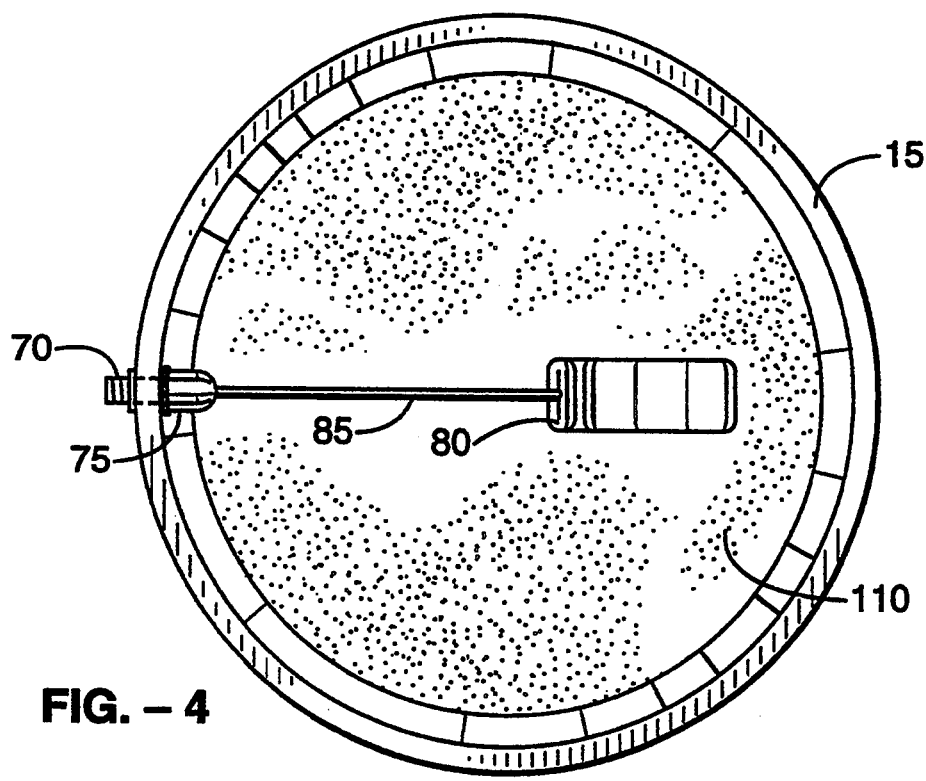
FIG. — 4
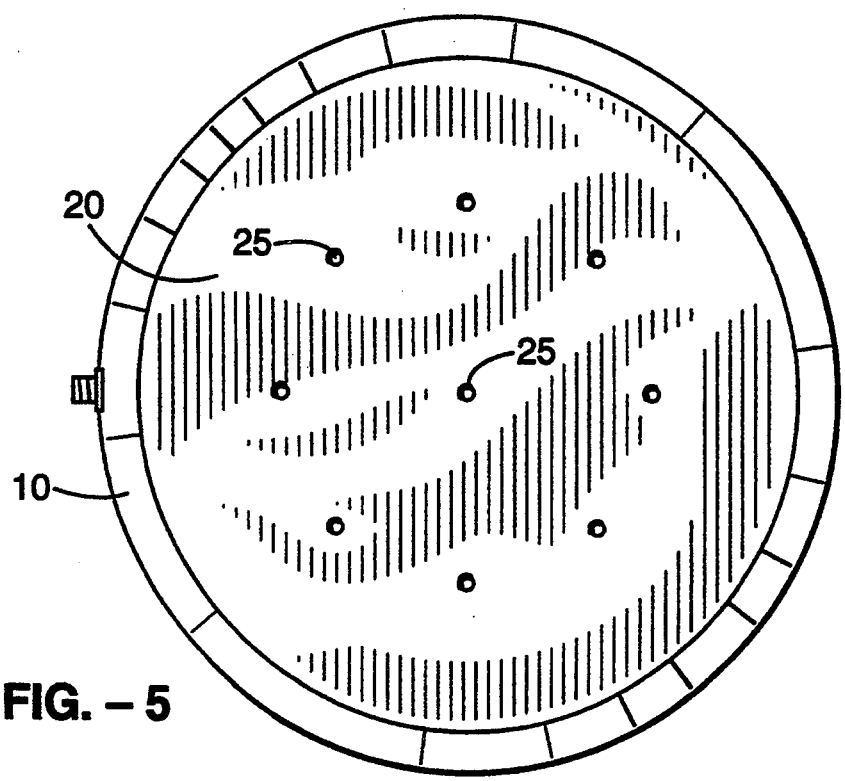
FIG. — 5

DRIP WATERING APPARATUS

BACKGROUND OF THE INVENTION

1. Field of the Invention

Disclosed is an apparatus for drip watering plants with a generally continuous flow of water rather than an applied pool of water. More precisely, a portable container having an automated filing system and passive drip delivery means is provided.

2. Description of the Background Art

Various watering devices have been developed in the past. Many of these devices permit a user to spot water various locations with sporadic applications of limited water.

Specifically, U.S. Pat. No. 2,375,860 discloses an irrigation appliance having a combined support and water delivery hollow spike. The spike is inserted into the ground to be watered. Water is held in an upper first container and percolated into a lower second container having a fertilizer. The fertilizer solution then exits into the spike and, via apertures in the distal end of the spike, escapes from the device to water the ground.

U.S. Pat. No. 3,026,827 relates a plant watering and feeding device having a perforated spike that is inserted into the ground for delivering water. Included is a plant food container and associated valves for selectively extracting the food into the delivered water.

Related in U.S. Pat. No. 3,168,224 is a drip feed device. The apparatus is clamped to the rim of a soil containing pot. Water is delivered from a reservoir container into a tilt basin, via an adjustable drip valve. When the tilt basin is filled it tips and applies the water to the soil.

A siphon tank water delivery system is described in U.S. Pat. No. 3,272,225. Various tubes, valves, and containers permit a desired amount of water to be conveyed to the plant.

Attached to a siphon-type water delivery apparatus is a hollow spike that is inserted into the ground to be watered and controls the delivery of additional water as related in U.S. Pat. No. 3,856,205. When the ground becomes dry, the hollow spike communicates this condition to the device by allowing air to pass into a controlling system that then delivers water to the ground to once again turn off the delivery when the ground is wet, thus blocking air passage into the controlling system.

U.S. Pat. No. 5,117,582 discloses a tree irrigator that comprises a tree encircling container. An outer support container holds an inner water container. In the bottom of the water container is a water exit hole. In the bottom of the outer support container are holes for delivering the water to the tree. Between the inner and outer container are a support pad, spacers, and a wire mesh for aiding in structural support and drainage.

A gravel-fertilizer packet for potted plants is shown in U.S. Pat. No. 5,181,951. A water permeable fertilizer packet is placed in the bottom a planting pots to aid in feeding the plant and in preventing loss of soil through the pot's drain hole.

U.S. Pat. No. 5,212,905 presents a plant watering device comprising a cylindrical reservoir that surrounds the plant. The device contains an adjustable drip valve means in fluid communication with the reservoir that delivers water or nutrients dropwise to the plant.

Lastly, U.S. Pat. No. 5,252,302 discloses a liquid fertilizer apparatus that utilizes a container that holds a porous sack of nutrients. Water is manually introduced into the container and then allowed to exit slowly through an adjustable valve and onto a plant.

The subject device expands upon and improves the prior art by permitting a user to employ an easily constructed, relatively inexpensive, and effective way to water plants with a virtually continuous flow of water.

SUMMARY OF THE INVENTION

An object of the present invention is to provide a means for drip watering a plant.

An additional object of the present invention is to supply for increased growth, a means to conserve water and yet furnish enough water to create a prescribed drip period or feeding time each day.

Another object of the present invention is to disclose an apparatus that is inexpensive and reliable for delivering a flow of liquid to a plant.

A further object of the present invention is to relate an improved drip irrigation apparatus that has an adjustable outlet flow of liquid.

Still another object of the present invention is to furnish a drip irrigation system having an easily portable reservoir, an adjustable inlet and outlet flow, and means for including fertilizer during the irrigation.

Yet a further object of the present invention is to describe a drip irrigation system that includes means for shading a reservoir from direct exposure to the sun.

Still yet a further object of the present invention is to provide a drip irrigation having means for leveling the apparatus over the ground proximate a plant to be watered.

Disclosed is a drip irrigating apparatus for supplying a liquid, usually water or water and a combination of nutrients or fertilizer to a plant. The subject apparatus comprises a reservoir for containing the liquid having a side wall, an upper rim, and a bottom having a plurality of apertures. A base for holding and supporting the reservoir is included which comprises a base platform having a central aperture and means attached to the base platform for holding releasably the reservoir in an essentially vertical orientation. Further comprising the base is means for supporting the reservoir above the base platform to permit the outgoing liquid to pass through the central aperture and onto an area of ground proximate the plant.

Provided in the subject apparatus is a cover adapted to incorporate an overhang extending beyond the reservoir side wall to help shade the reservoir from direct exposure to sun. The cover is releasably fitted to the reservoir upper rim.

Hose attachment means are secured to the reservoir proximate the upper rim for attaching a hose for supplying incoming liquid to the reservoir. Inlet control means are associated with the hose attachment means for regulating an amount of incoming liquid into the reservoir.

Supplied is an outlet control means for regulating an amount of outgoing liquid from the reservoir. More specifically, the outlet control means comprises a support member with upper and lower surfaces and a perimeter edge having a plurality of apertures extending between and through the upper and lower surfaces. The support member fits within the reservoir proximate the reservoir bottom and is often elevated above the bottom by a set of spacers. Additionally, a liquid permeable filter sheet is positioned immediately above the support member upper surface. A bed of particulate matter is layered immediately above and on the filter sheet. The particulate matter is selected to be too large in size to pass through the filter sheet. Also, attached to the perimeter edge is a seal that inhibits the particulate matter and water from passing the support member towards the reservoir bottom. To properly control the flow of water, the water is directed to pass through the filter and not around its edges.

Usually, provided is means for leveling the base and thereby the reservoir over the underlying ground in which the plant is growing.

Other objects, advantages, and novel features of the present invention will become apparent from the detailed description that follows, when considered in conjunction with the associated drawings.

BRIEF DESCRIPTION OF THE DRAWINGS

FIG. 4 is a top view of the reservoir container of the subject apparatus with the reservoir container holding sand.

FIG. 5 is a bottom view of the reservoir container of the subject apparatus.

DESCRIPTION OF THE PREFERRED EMBODIMENT

Figure 1:
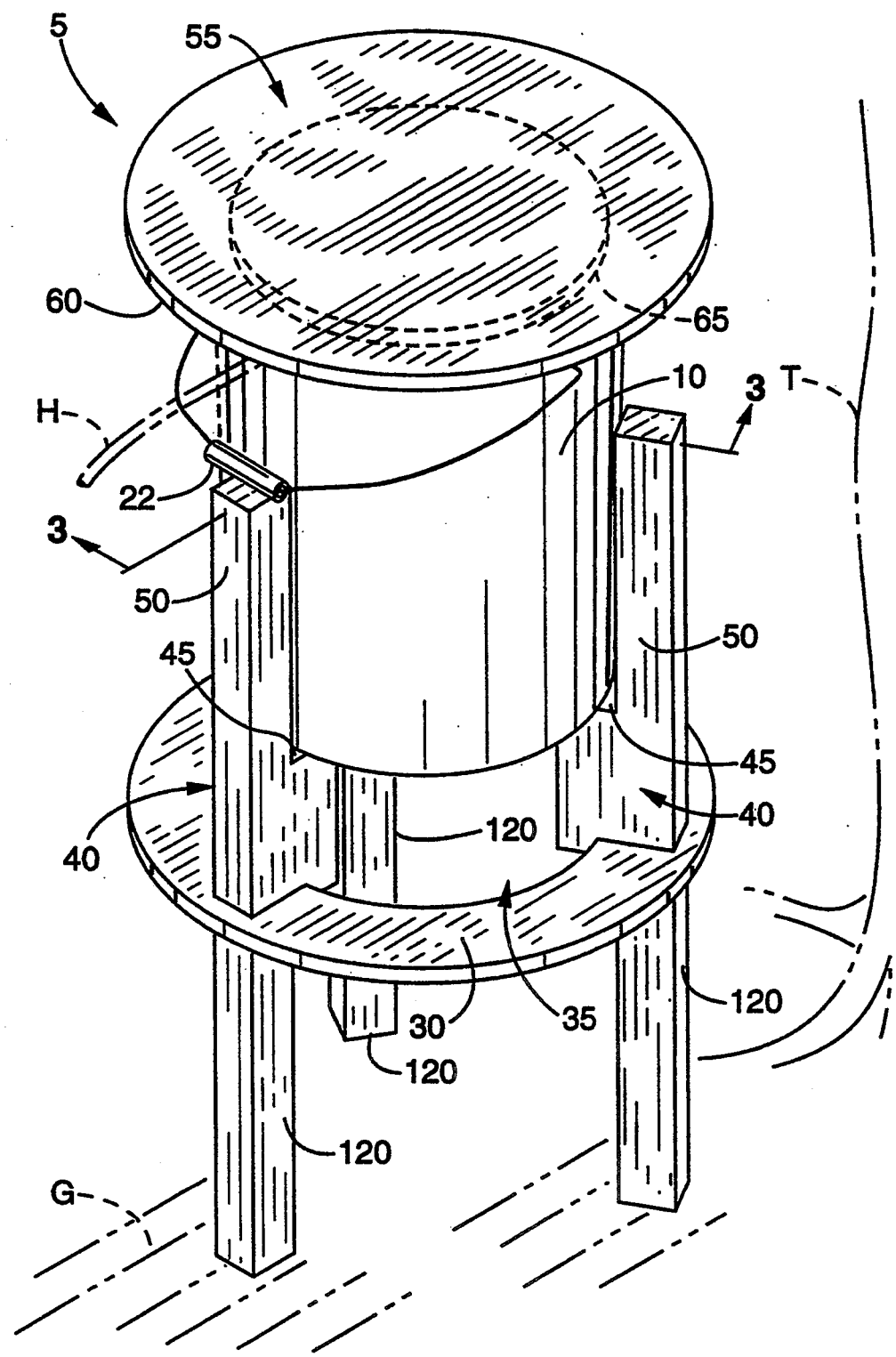
FIG. 1 is a perspective view of the subject apparatus

Referring now to FIGS. 1–6, there is shown a preferred embodiment of a drip watering apparatus 5. FIG. 1 depicts the subject invention as it might be positioned over the ground G near a tree T to be watered. Comprising the subject apparatus 5 is a reservoir for containing the liquid to be delivered to the plant. Generally, the liquid is water, but mixtures of water with other substances (such as fertilizers, nutrients, other desired chemicals, and the like) are possible. The reservoir comprises a side wall 10 that is generally continuous and often a slightly tapered cylinder, although other configuration are contemplated to be within the realm of this disclosure. The side wall terminates in an upper rim 15 and a bottom 20. Traditional buckets have a shape suitable for serving as an acceptable reservoir. The reservoir is fabricated from water insoluble materials such a natural and synthetic polymers and non-corrosive metals and metal alloys. Although not mandatory, preferably, the reservoir is formed as a unified construction or single unit with the rim 15, bottom 20, and side wall 10 connected into a seamless piece.

Figure 2:
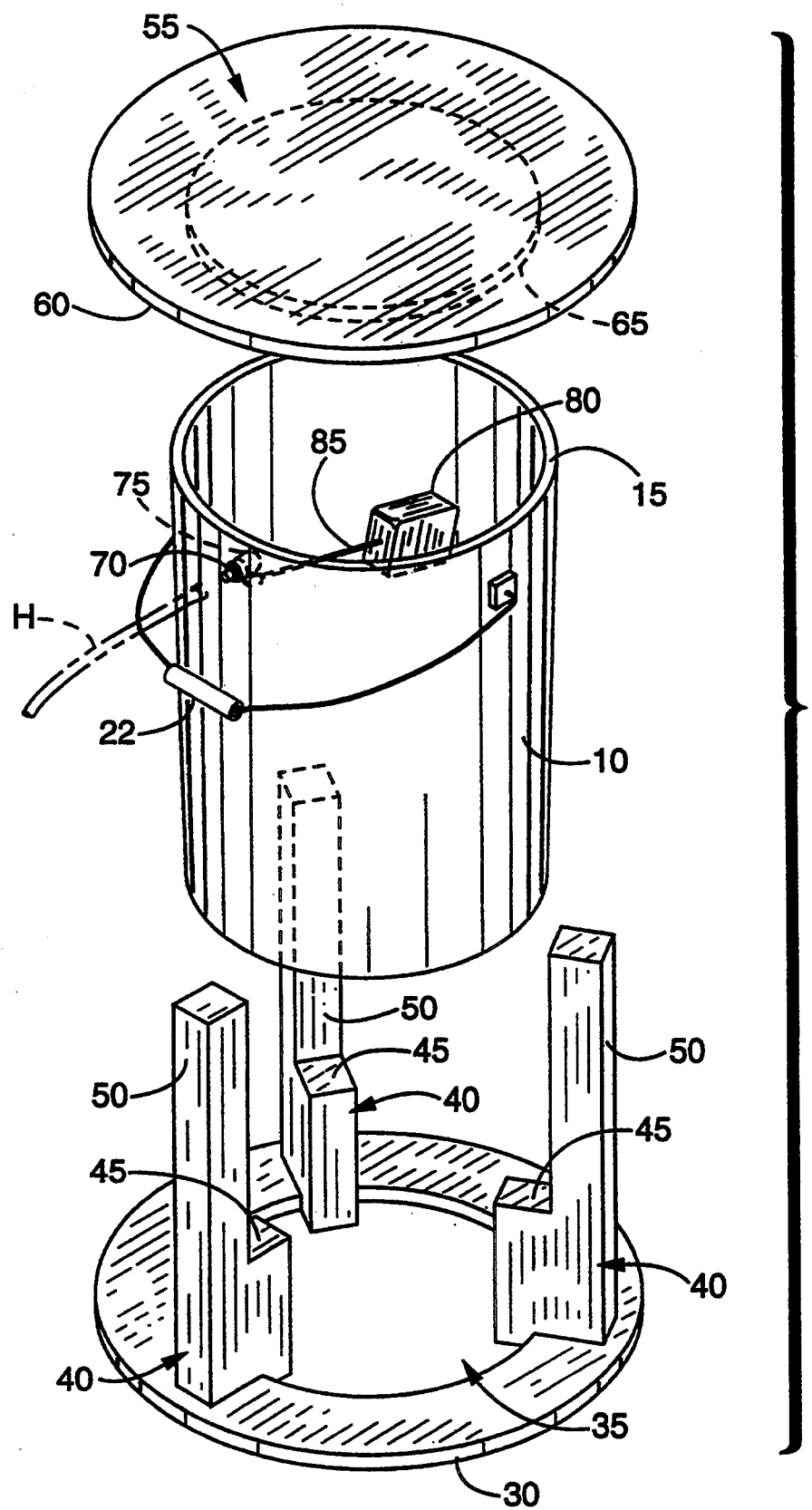
FIG. 2 is an exploded perspective view of the subject apparatus.

For portability, a optional handle 22 is often included (shown in FIGS. 1 and 2. Typically the handle 22 fastens to the outside of the reservoir side wall 10 by standard means. Therefore, an inexpensive or discarded plastic pail or bucket with a handle can easily serve as the reservoir.

Formed into the reservoir's bottom 20 is at least one aperture 25, generally a plurality of apertures 25. Liquid exiting from the reservoir passes through the apertures 25 and drips towards the underlying supporting surface, usually the ground G. The diameter of the apertures 25 is variable and is selected to accommodate the particular reservoir volume and delivery rate. The diameter is often between about one-eighth inch to about one-half inch, but may be smaller of larger if needed. The apertures are either directly formed in the bottom 20 during fabrication of the reservoir or added later by drilling, punching, melting, and equivalent methods.

The reservoir is held and supported by a base. Various equivalent bases are suitable for holding the subject reservoir and the following configuration is by way of example only. Comprising the base are a base platform 30, means attached to the base platform 30 for holding releasably the reservoir in an essentially vertical orientation, and means for supporting the reservoir above the base platform 30 to permit the outgoing liquid to pass through a central aperture 35 in the base platform 30. Ordinarily, the releasable holding means and supporting means are structurally combined into a plurality of support elements 40. Depicted are three such support elements 40, but two, three, and four or more support members 40 are contemplated as appropriate, as is a single continuous version. Typically, the support element 40 comprises a support ledge 45 upon which the reservoir sits and a support finger 50 which holds the reservoir over the support ledge 45. As indicated, other equivalent bases are acceptable if they permit the reservoir to be suitably held and supported and allow the exiting water to impinge the ground.

Figure 3:
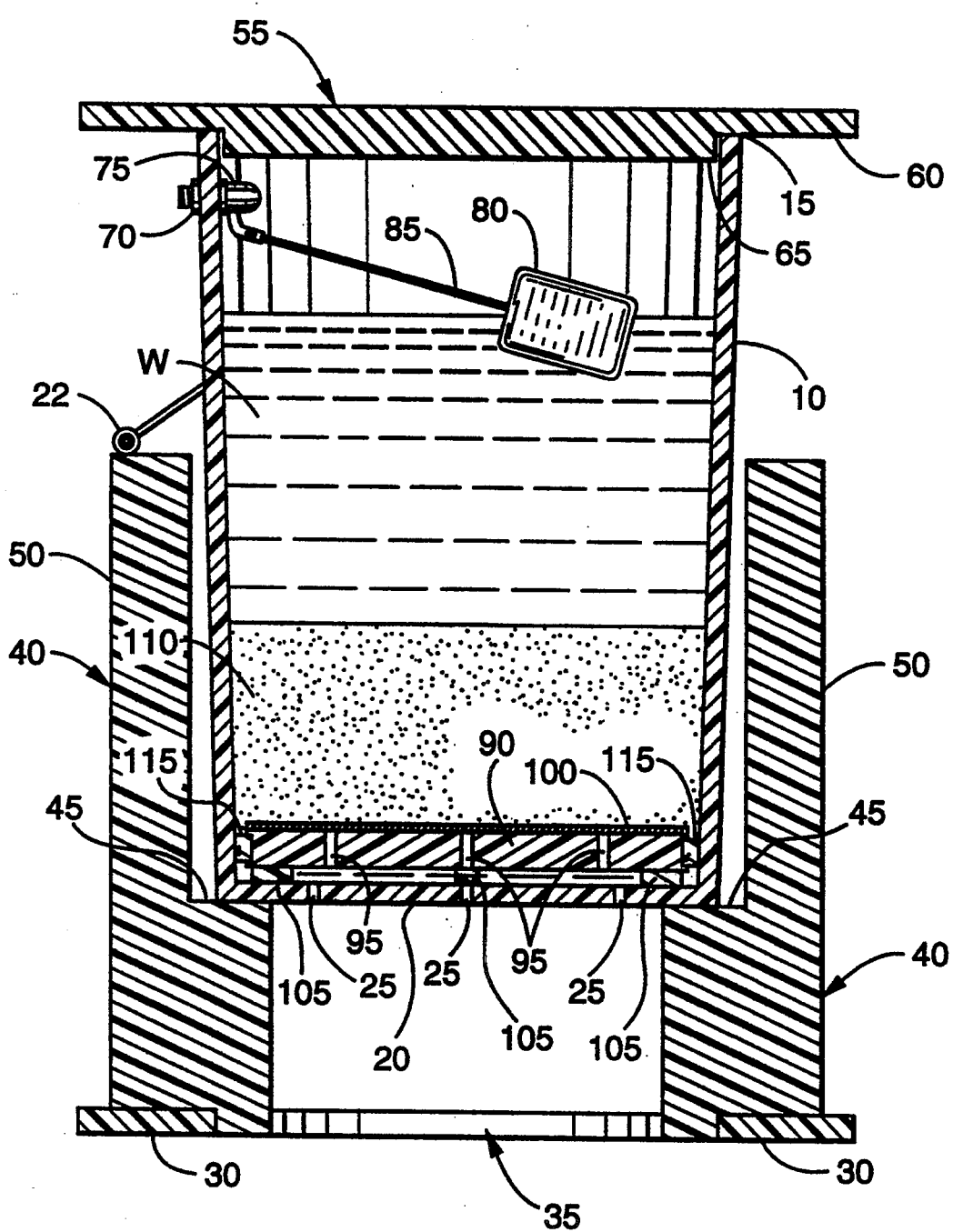
FIG. 3 is a cross sectional view of the subject apparatus.

Included in the subject invention is a cover 55 with a perimeter overhang 60 extending beyond the reservoir side wall 10 to help shade the reservoir and its liquid contents from direct exposure to the sun. The cover 55 is releasably fitted to the reservoir's upper rim 15. The extent of the overhang 60 is variable and is commonly between about one inch and about six inches, but may be shorter or longer if desired. As depicted in FIG. 3, the cover 55 has a lower lip or projection 65 that fits within the reservoir, at the upper rim 15, to center and stabilize the cover 55 over and to the reservoir. The cover 55 is easily removed and replaced when needed. The cover 55 is fabricated from generally rigid materials such as natural and synthetic polymers, wood, and metals.

Although the reservoir may be filled with liquid by directly pouring the liquid into the reservoir, preferably, a hose H or pipe attachment means is provided. The hose H is coupled onto the attachment means be stand methods such as threads, clamps, and the like. Generally, the hose attachment means comprises a hose fitting 70 that is secured by standard means to the reservoir side wall 10, proximate the upper rim 15.

A liquid inlet control means is provided and often associated with the hose attachment means. Pictured in FIGS. 2–4 is a combined liquid inlet and cut-off or shut-off valve which is linked to a float 80 via a connecting arm 85. As the float 80 is forced upward by incoming water the cut-off valve 75 is adjusted to eventually stop the water flow. As the water W within the reservoir falls during the irrigation process, the float 80 lowers and activates the cut-off valve 75 to deliver more liquid into the reservoir.

Figure 6:
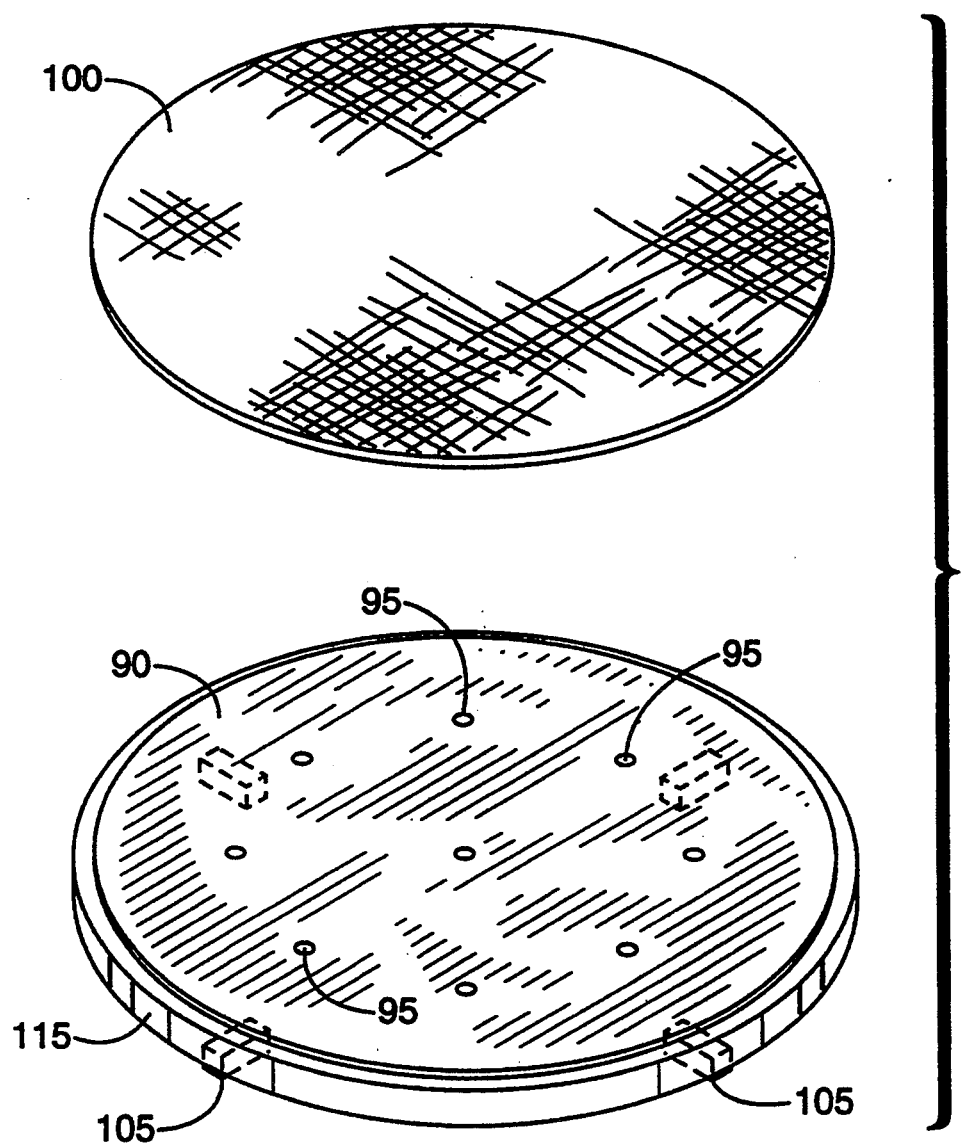
FIG. 6 is an exploded perspective view showing the filter and filter support of the subject apparatus.

Key to the functioning of the subject apparatus is the provided liquid outlet means for regulating an amount of outgoing liquid from the reservoir. The outlet control means comprises a support member 90 that is illustrated in FIGS. 3 and 6 as being generally planar, but other shapes such as concave, convex and the like are possible. The support member 90 has upper and lower surfaces and a perimeter edge. Extending between and through the upper and lower surfaces of the support member 90 are a plurality of apertures 95. The support member is sized to fit within the reservoir, proximate the reservoir bottom 20. The support member 90 functions to support a filter 100 that is positioned immediately above the support member's 90 upper surface. The support member 90 is usually formed from rigid materials that provide sufficient support for the filter 100.

Usually, beneath the support member 90 is a means for elevating the support member 90 from directly contacting the reservoir's bottom 20. An open volume in this region of the reservoir (between the bottom 20 and support member 90 lower surface) aids in the passage of liquid from the support member apertures 95 to and through the bottom apertures 25. Usually, a set of spacers 105 comprise the elevating means. Each spacer 105 is commonly attached to the lower surface of the support member 90, as illustrated in FIG. 6, however, each spacer 105 may be incorporated into the reservoir bottom 20 or side wall 10 or be an independent item. Additionally, the support member 90 can be suspended directly or indirectly from the rim 15 of the reservoir by suitable means. Also, the set of spacers 105 may be formed into a continuous spacer with or without suitable liquid passing channels and is so defined as to include this possibility.

The filter 100 is a liquid permeable sheet of suitable material such as cloth, paper products, natural and synthetic polymers, and the like. The liquid that is within the reservoir eventually flows through the filter 100 and collects on the underlying support member 90. The liquid then passes through the apertures 95 in the support member 90. Preferably, the filter 100 is sturdy enough to undergo cleaning when needed. The thickness of the filter 100 and the type of material from which the filter 100 is fabricated are selected to permit a desired liquid flow rate. Additionally as seen in FIGS. 3 and 4, a bed of particulate matter 110 is layered on the filter 100 and the filter must have a compositional structure that permits the flow of liquid but not the passage of particulate matter 110.

The particulate matter 110 is sand, gravel, and the like that is selected for its ability to pass a desired amount of liquid in a given period of time. Particle size within the particulate matter 110 and interactive characteristics between the particles within the particulate matter determine the liquid flow rate. The size of the particles comprising the particulate matter are selected to have a size too large to pass through the underlying filter 100 (or disk 125, described below). Generally for any one type of particulate matter 110, the thicker the layer of particulate matter 110, the slower the passage of liquid. Depending upon the desired liquid flow rate, the thickness of the layer of particulate matter 110 is varied. Further, inherent in the subject reservoir's design is the capability that the particulate matter 110 is easily removed from the reservoir for cleaning, replacing, and the like.

Additionally, the support member 90 is usually fitted with a perimeter seal 115 of compressible material. The seal 115 presses against the reservoir side wall 10 to block or inhibit the passage of particulate matter 110 towards the reservoir bottom 20 or water around the perimeter of the support member 90. Suitable materials for fabricating the seal 115 comprise resilient natural and synthetic polymers, cloth, paper products, and the like.

To facilitate leveling the subject apparatus over uneven ground, leveling means are included. Usually, the leveling means comprises an adjustable system such as the depicted (see FIG. 1) stakes 120 that are inserted into the ground to suitable depths to level the base platform 30 that sits on the stakes 120. Clearly, other equivalent leveling means are acceptable and within the domain of this disclosure.

Figure 7:
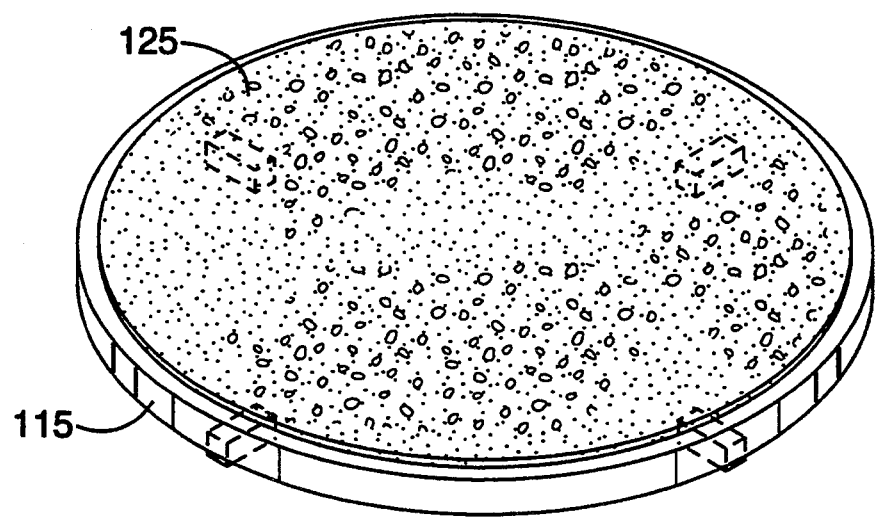
FIG. 7 is a perspective view of another embodiment of the water outlet control means of the subject apparatus.

An additional embodiment of the subject invention comprises an outlet control means that is depicted in FIG. 7. FIG. 7 shows a unified disk 125 that is water permeable and substitutes for the support member 90 and filter 100. Feet, equivalent to the elevating spacers 105, are optionally incorporated into the disk 125. The seal 115 still surrounds the perimeter edge of the disk 125, as with the support member 90. The one-piece or unified disk 125 may be utilized as an equivalent element to the combined member 90 and filter 100 pairing. Fabrication of the disk 125 is by any suitable means. Usually, the material employed to make the disk 125, with water porous properties, comprises cement with suitable quantities of sand or other porous generating substances. Other materials equivalent to cement and sand are contemplated to be within the realm of this disclosure.

Also, even though the subject apparatus is envisioned as being a reusable device and fabricated from durable materials, disposable versions are contemplated. Thus, less permanent and less costly materials may be selected for disposable devices.

For exemplary purposes only and not exclusively, the subject apparatus is often utilized as one unit among many such units in an orchard of trees. Each tree has at least one drip watering system positioned near its base. To prevent excess heating by the sun, the subject unit is generally placed in any available shade. However, the unit is often positioned in the direct sun and the shading capability of the included cover mitigates the sun's heating of the liquid within the reservoir (abnormally warm irrigation water, in some circumstances, may be harmful to certain plants). Further, if required, the subject apparatus is leveled via the leveling means.

Although each drip apparatus may be utilized as a stand alone watering unit with no direct connection to a water supplying means, usually, each apparatus is attached to a water delivery hose or pipe. The water delivery hose is usually equipped with means (often a timer or equivalent system) for regulating the periods in which water is supplied to the hose. During periods in which water is supplied to the hose, the reservoir fills to the cut-off level and is maintained at that level via the float valve control. About a 45 minute filling cycle is common, but other time intervals are acceptable and depend upon such factors as the type of plant, type of soil, reservoir volume, and the like. The water within the reservoir percolates down through the particulate layer, through the filter and support member, and out the apertures in the bottom of the reservoir. To slow or speed the delivery of water, the type or thickness of filter and the type and thickness of particulate matter is adjusted.

Fertilizer and other nutrients are placed either directly within the reservoir or, more usually, directly beneath the reservoir. The stream of exiting drips slowly dissolve the nutrients for transportation into the soil and to the roots of the plant.

Given the disclosed configuration of the subject apparatus, it is easily disassembled for cleaning and replacement of damaged components. Also, particulate matter and filter alterations are easily accomplished with the subject apparatus.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A drip irrigating apparatus for supplying a liquid to a plant, comprising:
    a) a reservoir for containing the liquid having a side wall, an upper rim, and a bottom having a plurality of apertures;
    b) a base for holding and supporting said reservoir;
    c) a cover releasably fitted to said reservoir upper rim;
    d) inlet control means for admitting and regulating an amount of incoming liquid into said reservoir; and
    e) outlet control means for regulating an amount of outgoing liquid from said reservoir, wherein said outlet control means comprises:
        a support member with upper and lower surfaces and a perimeter edge having a plurality of apertures extending between and through said upper and lower surfaces, wherein said support member fits within said reservoir proximate said reservoir bottom;
        a liquid permeable filter sheet positioned immediately above said support member upper surface; and
        a bed of particulate matter layered immediately above and on said filter sheet, wherein said particulate matter is too large in size to pass through said filter sheet.

2. A drip irrigating apparatus according to claim 1, wherein said outlet control means further comprises a seal attached to said perimeter edge that inhibits said particulate matter from passing said support member towards said reservoir bottom.

3. A drip irrigating apparatus for supplying a liquid to a plant, comprising:
    a) a reservoir for containing the liquid having a side wall, an upper rim, and a bottom having a plurality of apertures;
    b) a base for holding and supporting said reservoir;
    c) a cover releasably fitted to said reservoir upper rim;
    d) inlet control means for admitting and regulating an amount of incoming liquid into said reservoir; and
    e) outlet control means for regulating an amount of outgoing liquid from said reservoir, wherein said outlet control means comprises:
        a liquid permeable disk with a perimeter edge, wherein said disk fits within said reservoir proximate said reservoir bottom and
        a bed of particulate matter layered immediately above and on said disk.

4. A drip irrigating apparatus according to claim 3, wherein said outlet control means further comprises a seal attached to said disk perimeter edge that inhibits said particulate matter and liquid from passing by said disk towards said reservoir bottom.

5. A drip irrigating apparatus for supplying a liquid to a plant, comprising:
    a) a reservoir for containing the liquid having a side wall, an upper rim, and a bottom having a plurality of apertures;
    b) a base for holding and supporting said reservoir;
    c) a cover adapted to incorporate an overhang extending beyond said reservoir side wall to help shade said reservoir from direct exposure to sun, wherein said cover is releasably fitted to said reservoir upper rim;
    d) hose attachment means secured to said reservoir proximate said upper rim for attaching a hose for supplying incoming liquid to said reservoir;
    e) inlet control means associated with said hose attachment means for regulating an amount of incoming liquid into said reservoir; and
    f) outlet control means for regulating an amount of outgoing liquid from said reservoir, wherein said outlet control means comprises:
        a support member with upper and lower surfaces and a perimeter edge having a plurality of apertures extending between and through said upper and lower surfaces, wherein said support member fits within said reservoir proximate said reservoir bottom;
        a liquid permeable filter sheet positioned immediately above said support member upper surface;
        a bed of particulate matter layered immediately above and on said filter sheet, wherein said particulate matter is too large in size to pass through said filter sheet; and
        a seal attached to said perimeter edge that inhibits said particulate matter from passing said support member towards said reservoir bottom.

6. A drip irrigating apparatus according to claim 5, wherein said outlet control means further comprises a set of spacers positioned between said support member lower surface and said reservoir bottom for elevating said support member above said reservoir bottom.

7. A drip irrigating apparatus for supplying a liquid to a plant, comprising:
    a) a reservoir for containing the liquid having a side wall, an upper rim, and a bottom having a plurality of apertures;
    b) a base for holding and supporting said reservoir;
    c) a cover adapted to incorporate an overhang extending beyond said reservoir side wall to help shade said reservoir from direct exposure to sun, wherein said cover is releasably fitted to said reservoir upper rim;
    d) hose attachment means secured to said reservoir proximate said upper rim for attaching a hose for supplying incoming liquid to said reservoir;
    e) inlet control means associated with said hose attachment means for regulating an amount of incoming liquid into said reservoir; and
    f) outlet control means for regulating an amount of outgoing liquid from said reservoir, wherein said outlet control means comprises:
        a liquid permeable disk with a perimeter edge, wherein said disk fits within said reservoir proximate said reservoir bottom;
        a bed of particulate matter layered immediately above and on said disk; and
        a seal attached to said disk perimeter edge that inhibits said particulate matter and liquid from passing by said disk towards said reservoir bottom.

8. A drip irrigating apparatus according to claim 7, wherein said outlet control means further comprises a set of spacers positioned between said disk and said reservoir bottom for elevating said disk above said reservoir bottom.

9. A drip irrigating apparatus for supplying a liquid to a plant, comprising:
  a) a reservoir for containing the liquid having a side wall, an upper rim, and a bottom having a plurality of apertures;
  b) a base for holding and supporting said reservoir;
  c) a cover adapted to incorporate an overhang extending beyond said reservoir side wall to help shade said reservoir from direct exposure to sun, wherein said cover is releasably fitted to said reservoir upper rim;
  d) hose attachment means secured to said reservoir proximate said upper rim for attaching a hose for supplying incoming liquid to said reservoir;
  e) inlet control means associated with said hose attachment means for regulating an amount of incoming liquid into said reservoir; and
  f) outlet control means for regulating an amount of outgoing liquid from said reservoir, wherein said outlet control means comprises:
    a support member with upper and lower surfaces and a perimeter edge having a plurality of apertures extending between and through said upper and lower surfaces, wherein said support member fits within said reservoir proximate said reservoir bottom;
    a set of spacers positioned between said support member lower surface and said reservoir bottom for elevating said support member above said reservoir bottom;
    a liquid permeable filter sheet positioned immediately above said support member upper surface;
    a bed of particulate matter layered immediately above and on said filter sheet, wherein said particulate matter is too large in size to pass through said filter sheet; and
    a seal attached to said perimeter edge that inhibits said particulate matter from passing said support member towards said reservoir bottom.

10. A drip irrigating apparatus according to claim 9, wherein said base comprises:
  a) a base platform having a central aperture;
  b) means attached to said base platform for holding releasably said reservoir in an essentially vertical orientation and
  c) means for supporting said reservoir above said base platform to permit said outgoing liquid to pass through said central aperture and onto an area of ground proximate the plant.

11. A drip irrigating apparatus according to claim 10, further comprising means for leveling said base and thereby leveling said reservoir, wherein said leveling means comprises a plurality of stakes inserted into the underlying ground and adjusted in height to support in a level position said base platform.

12. A drip irrigating apparatus for supplying a liquid to a plant, comprising:
  a) a reservoir for containing the liquid having a side wall, an upper rim, and a bottom having a plurality of apertures;
  b) a base for holding and supporting said reservoir;
  c) a cover adapted to incorporate an overhang extending beyond said reservoir side wall to help shade said reservoir from direct exposure to sun, wherein said cover is releasably fitted to said reservoir upper rim;
  d) hose attachment means secured to said reservoir proximate said upper rim for attaching a hose for supplying incoming liquid to said reservoir;
  e) inlet control means associated with said hose attachment means for regulating an amount of incoming liquid into said reservoir; and
  f) outlet control means for regulating an amount of outgoing liquid from said reservoir, wherein said outlet control means comprises:
    a liquid permeable disk with a perimeter edge, wherein said disk fits within said reservoir proximate said reservoir bottom;
    a bed of particulate matter layered immediately above and on said disk; and
    a seal attached to said disk perimeter edge that inhibits said particulate matter and liquid from passing by said disk towards said reservoir bottom.

* * * * *